(12) United States Patent
Kusano

(10) Patent No.: US 11,343,395 B2
(45) Date of Patent: May 24, 2022

(54) APPARATUS AND NON-TRANSITORY COMPUTER READABLE MEDIUM

(71) Applicant: FUJIFILM Business Innovation Corp., Tokyo (JP)

(72) Inventor: Nobumi Kusano, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/022,116

(22) Filed: Sep. 16, 2020

(65) Prior Publication Data

US 2021/0243312 A1 Aug. 5, 2021

(30) Foreign Application Priority Data

Feb. 3, 2020 (JP) .............................. JP2020-016330

(51) Int. Cl.
*H04N 1/00* (2006.01)

(52) U.S. Cl.
CPC ....... *H04N 1/0049* (2013.01); *H04N 1/00411* (2013.01); *H04N 1/00424* (2013.01); *H04N 1/00477* (2013.01); *H04N 2201/0094* (2013.01)

(58) Field of Classification Search
CPC ............ H04N 1/0049; H04N 1/00411; H04N 1/00477; H04N 1/00424; H04N 2201/0094
USPC ....................................................... 358/1.15
See application file for complete search history.

(56) References Cited

U.S. PATENT DOCUMENTS

| | | | | |
|---|---|---|---|---|
| 2018/0173543 A1* | 6/2018 | Ukegawa | ................. | B41J 29/00 |
| 2018/0309901 A1* | 10/2018 | Yokoyama | ......... | H04N 1/33384 |
| 2018/0373470 A1* | 12/2018 | Hayashi | ............. | H04N 1/00517 |
| 2019/0230235 A1* | 7/2019 | Hayakawa | ......... | H04N 1/00477 |

FOREIGN PATENT DOCUMENTS

| | | |
|---|---|---|
| JP | 2004314773 | 11/2004 |
| JP | 2011-253452 | 12/2011 |
| JP | 2014-179038 | 9/2014 |

* cited by examiner

Primary Examiner — Neil R Mclean
(74) Attorney, Agent, or Firm — JCIPRNET

(57) ABSTRACT

An apparatus includes a processor. The processor is configured to identify a user who is operating the apparatus provided with the processor and execute display control involving controlling display of a notification related to a process executed by the apparatus on a display device provided in the apparatus in accordance with whether or not the identified user is a commander who has given a command for executing the process.

19 Claims, 13 Drawing Sheets

| EVENT ID | OPERATOR TYPE | MESSAGE | DISPLAY MODE |
|---|---|---|---|
| 0002 | JOB OWNER | DOCUMENT IS JAMMED IN DOCUMENT FEEDER OF SCANNER... | FULL SCREEN |
| | NON-JOB-OWNER | DOCUMENT IS JAMMED IN DOCUMENT FEEDER OF SCANNER... | • FULL-SCREEN DISPLAY MODE IF THERE IS COMPETITION IN RESOURCE(S)<br>• NO DISPLAY IF THERE IS NO COMPETITION IN RESOURCE(S) |
| ... | ... | ... | ... |
| 0055 | JOB OWNER | REATTEMPTING CONNECTION WITH TRANSFER DESTINATION, AND ** SECOND(S) REMAINING UNTIL TIMEOUT.<br>JOB IN WHICH NETWORK IS USED BY ANOTHER USER IS NOT EXECUTABLE UNTIL TIMEOUT SINCE NETWORK CONNECTION IS OCCUPIED.<br>DO YOU WANT TO CANCEL JOB IN PROGRESS? [YES] [NO] | FULL SCREEN |
| | NON-JOB-OWNER | REATTEMPTING CONNECTION WITH TRANSFER DESTINATION, AND ** SECOND(S) REMAINING UNTIL TIMEOUT.<br>JOB IN WHICH NETWORK IS USED BY ANOTHER USER IS NOT EXECUTABLE UNTIL TIMEOUT. | • BANNER DISPLAY MODE IF THERE IS COMPETITION IN RESOURCE(S)<br>• NO DISPLAY IF THERE IS NO COMPETITION IN RESOURCE(S) |
| ... | ... | ... | ... |
| 0123 | JOB OWNER | (NO MESSAGE TO BE DISPLAYED) | (NO DISPLAY) |
| | NON-JOB-OWNER | PRINTING IS NOT IMMEDIATELY EXECUTABLE SINCE PRINTER IS BEING USED FOR ANOTHER JOB.<br>NEXT PRINTING MAY START IN APPROXIMATELY ** SECOND(S). | • BANNER DISPLAY MODE IF THERE IS COMPETITION IN RESOURCE(S)<br>• NO DISPLAY IF THERE IS NO COMPETITION IN RESOURCE(S) |
| ... | ... | ... | ... |

220 — DOCUMENT JAM

DOCUMENT IS JAMMED IN DOCUMENT FEEDER OF SCANNER.
PLEASE OPEN COVER OF DOCUMENT FEEDER AND REMOVE DOCUMENT.

| JOB ID | JOB TYPE | JOB OWNER | STATUS |
|---|---|---|---|
| 00123 | PRINT | SUZUKI | IN PROGRESS |
| 00124 | SCAN AND MAIL TRANSMISSION | SATO | IN PROGRESS |
| ... | ... | ... | ... |

FIG. 6

| JOB TYPE | RESOURCE(S) USED |
|---|---|
| COPY | SCANNER AND PRINTER |
| PRINT | PRINTER |
| SCAN | SCANNER |
| MAIL TRANSMISSION | NETWORK |
| FTP TRANSFER | NETWORK |
| FAX TRANSMISSION | FACSIMILE APPARATUS |
| ... | ... |

FIG. 7

| SCREEN (APPLICATION) ID | RESOURCE(S) USED | RESOURCE(S) USED IN SCREEN OF TRANSITION DESTINATION |
|---|---|---|
| COPY | SCANNER AND PRINTER | — |
| PRINT | PRINTER | — |
| SCAN AND SAVE IN BOX | SCANNER | — |
| SCAN AND MAIL TRANSMISSION | SCANNER AND NETWORK | — |
| BOX | — | PRINTER AND NETWORK |
| FORM REGISTRATION | — | SCANNER AND NETWORK |
| ... | ... | ... |

↓ SCREEN TRANSITION

FIG. 9

| EVENT ID | OPERATOR TYPE | MESSAGE | DISPLAY MODE |
|---|---|---|---|
| 0002 | JOB OWNER | DOCUMENT IS JAMMED IN DOCUMENT FEEDER OF SCANNER... | FULL SCREEN |
| | NON-JOB-OWNER | DOCUMENT IS JAMMED IN DOCUMENT FEEDER OF SCANNER... | • FULL-SCREEN DISPLAY MODE IF THERE IS COMPETITION IN RESOURCE(S)<br>• NO DISPLAY IF THERE IS NO COMPETITION IN RESOURCE(S) |
| ... | ... | ... | ... |
| 0055 | JOB OWNER | REATTEMPTING CONNECTION WITH TRANSFER DESTINATION, AND ✽✽ SECOND(S) REMAINING UNTIL TIMEOUT.<br>JOB IN WHICH NETWORK IS USED BY ANOTHER USER IS NOT EXECUTABLE UNTIL TIMEOUT SINCE NETWORK CONNECTION IS OCCUPIED.<br>DO YOU WANT TO CANCEL JOB IN PROGRESS? [YES] [NO] | FULL SCREEN |
| | NON-JOB-OWNER | REATTEMPTING CONNECTION WITH TRANSFER DESTINATION, AND ✽✽ SECOND(S) REMAINING UNTIL TIMEOUT.<br>JOB IN WHICH NETWORK IS USED BY ANOTHER USER IS NOT EXECUTABLE UNTIL TIMEOUT. | • BANNER DISPLAY MODE IF THERE IS COMPETITION IN RESOURCE(S)<br>• NO DISPLAY IF THERE IS NO COMPETITION IN RESOURCE(S) |
| ... | ... | ... | ... |
| 0123 | JOB OWNER | (NO MESSAGE TO BE DISPLAYED) | (NO DISPLAY) |
| | NON-JOB-OWNER | PRINTING IS NOT IMMEDIATELY EXECUTABLE SINCE PRINTER IS BEING USED FOR ANOTHER JOB.<br>NEXT PRINTING MAY START IN APPROXIMATELY ✽✽ SECOND(S). | • BANNER DISPLAY MODE IF THERE IS COMPETITION IN RESOURCE(S)<br>• NO DISPLAY IF THERE IS NO COMPETITION IN RESOURCE(S) |
| ... | ... | ... | ... |

FIG. 12

| EVENT ID | EVENT TYPE | MESSAGE |
|---|---|---|
| 0002 | ERROR | DOCUMENT IS JAMMED IN DOCUMENT FEEDER OF SCANNER... |
| ... | ... | ... |
| 0055 | WAIT UNTIL TIMEOUT | REATTEMPTING CONNECTION WITH TRANSFER DESTINATION, AND ∗∗ SECOND(S) REMAINING UNTIL TIMEOUT.<br>JOB IN WHICH NETWORK IS USED IS NOT EXECUTABLE UNTIL TIMEOUT. |
| ... | ... | ... |
| 0123 | WAIT FOR COMPLETION OF PROCESS | PRINTING IS NOT IMMEDIATELY EXECUTABLE SINCE PRINTER IS BEING USED FOR ANOTHER JOB.<br>PRINTING MAY START IN APPROXIMATELY ∗∗ SECOND(S). |
| ... | ... | ... |

APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-016330 filed Feb. 3, 2020.

BACKGROUND

(i) Technical Field

The present disclosure relates to apparatuses and non-transitory computer readable media.

(ii) Related Art

Some apparatuses, such as so-called multifunction apparatuses, have a function for displaying an operation screen and accepting an operation command for performing a different process while executing a process corresponding to a command given by a certain user. The operation screen may be operated by the user giving the command for the process in progress or by another user different therefrom. Moreover, the apparatus may also have set therein a manager who manages the apparatus.

The apparatus may sometimes display a notification related to the process in progress on a screen of a display device provided in the apparatus. For example, in a case where the process in progress is stopped due to an abnormality, the apparatus displays a screen showing a message having such a notification.

Japanese Unexamined Patent Application Publication Nos. 2011-253452 and 2014-179038 each disclose an apparatus or an information processing apparatus as a related art that provides a notification message to a user. The apparatus disclosed in each of Japanese Unexamined Patent Application Publication Nos. 2011-253452 and 2014-179038 changes the display mode of the message in accordance with the attributes of the notification message.

Japanese Unexamined Patent Application Publication No. 2004-314773 discloses a system for displaying a notification message about an event detected by a vehicle on a display device provided in the vehicle. In this system, when an event occurs during a period in which a user class as a current driver identified by a user identifier is not an owner, a message processor extracts a message corresponding to the occurring event and the user class from a message table in a memory and displays the message on the display device, and also stores the message, corresponding to the occurring event and the user class, extracted from the message table as unreported message data into the memory. Furthermore, when the user identifier identifies that the user the user class of which is an owner is the current driver, the message processor displays the message indicated in the unreported message data stored in the memory on the display device.

SUMMARY

In a case where a notification related to the process being executed by the apparatus is necessary, if the notification is set to be displayed on the operation screen when a manager of the apparatus is operating the apparatus, the notification is not provided to anyone until the manager operates the apparatus. Thus, a measure is sometimes not taken on a timely basis in response to the notification. On the other hand, displaying the notification on the operation screen regardless of whoever is operating the apparatus may confuse users unrelated to the notification or may induce a situation where the notification is transmitted to users who should not receive such a notification.

Aspects of non-limiting embodiments of the present disclosure relate to transmissibility of a notification to a more appropriate user, as compared with a method in which a notification related to a process being executed by an apparatus is displayed to a manager of the apparatus or a method in which the notification is displayed regardless of whoever is operating the apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an apparatus including a processor. The processor is configured to identify a user who is operating the apparatus provided with the processor and execute display control involving controlling display of a notification related to a process executed by the apparatus on a display device provided in the apparatus in accordance with whether or not the identified user is a commander who has given a command for executing the process.

BRIEF DESCRIPTION OF THE DRAWINGS

An exemplary embodiment of the present disclosure will be described in detail based on the following figures, wherein:

FIG. 6 illustrates management data of one or more resources used for each job type;

FIG. 7 illustrates management data of one or more resources used for each operation screen;

FIG. 9 illustrates management data with respect to each event acting as a target of a message;

FIG. 12 illustrates another example of the management data with respect to each event acting as a target of a message;

DETAILED DESCRIPTION

Schematic Functional Configuration of Apparatus

Figure 1:
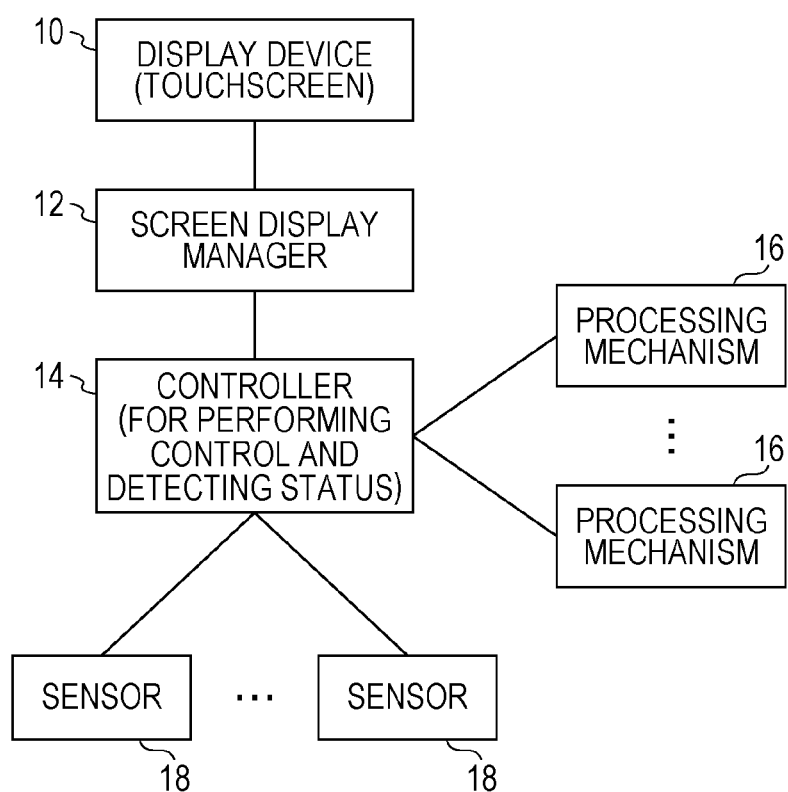
FIG. 1 illustrates a functional configuration of an apparatus.

An example of a functional configuration of an apparatus according to an exemplary embodiment will now be described with reference to FIG. 1. This apparatus provides a process executed by a processing mechanism 16 to a user. The type of the apparatus is not particularly limited and may be a printer, a scanner, a copier, a facsimile apparatus, a multifunction apparatus (i.e., an apparatus having a printer function, a scanner function, and a copier function), a kiosk terminal, an imaging apparatus, or a video apparatus. For example, if the apparatus is a multifunction apparatus, the apparatus includes one or more processing mechanisms 16. Examples of the processing mechanisms 16 include a printer, a scanner, a document feeder of the scanner, a network interface for network communication, a facsimile apparatus, and an information processing mechanism for information processing, such as job management.

A display device 10 displays display information for a user interface of the apparatus. In this example, the screen of the display device 10 is a touchscreen that detects a position touched by, for example, a user's finger on the screen.

A screen display manager 12 generates display information for a graphical-user-interface (GUI) type user interface screen that accepts a command for operating the apparatus, and supplies the display information to the display device 10 to cause the display device 10 to display the display information. This user interface screen will be referred to as "operation screen". The operation screen has display elements, such as a background, a window, an icon, a menu, and a button. The screen display manager 12 detects a user operation performed on any of the display elements in the operation screen based on a signal indicating a touched position from the display device 10 (touchscreen), so as to transmit a command indicated by the operation to a controller 14 or to update the display content on the operation screen in accordance with the operation. Furthermore, the screen display manager 12 controls message screen display to be described later.

The controller 14 controls each processing mechanism 16 in the apparatus so as to execute a process corresponding to an operation input by the user. The controller 14 receives a notification of an operational status, such as feedback or an error, from each processing mechanism 16 so as to constantly ascertain the status of the processing mechanism 16 based on the notification.

The apparatus is provided with sensors 18 for detecting the statuses of respective components in the apparatus. Each sensor 18 is of a type suitable for detecting the status of a corresponding target to be monitored. For example, in a case where the apparatus is a multifunction apparatus, examples of sensors 18 provided in a printing mechanism serving as one of the processing mechanisms 16 include sheet detection sensors located at various sections of a sheet transport path, a sensor that detects the number of sheets remaining in a sheet feed tray, and a sensor that detects the remaining amount of toner for each color. The controller 14 detects the statuses of sections corresponding to the respective sensors 18 based on signals transmitted from these sensors 18.

Examples of the operation screen generated by the screen display manager 12 include a main menu screen showing a list of functions (processes) provided by the apparatus and a functional screen used for setting parameters with respect to each of the functions. The screen displayed on the display device 10 transitions to another screen in accordance with an event acting as a trigger. A trigger event for screen transition may be a user operation or may be a status of the apparatus detected by the controller 14 from signals from each processing mechanism 16 and each sensor 18. For example, when the user presses (or touches) a button indicating a copy function on the main menu screen displayed on the display device 10 of the multifunction apparatus, the screen display manager 12 causes the operation screen displayed on the display device 10 to transition from the main menu screen to the functional screen for the copy function.

Furthermore, the screen display manager 12 executes a process for displaying a display element indicating a message (i.e., a notification to an operator) from the apparatus to the user. When the screen display manager 12 is notified by the controller 14 that a specific event has occurred, the screen display manager 12 causes the display device 10 to display the display element indicating the message corresponding to the event in a manner such that the display element is superposed on the currently-displayed operation screen. For example, based on a signal from the sensor that detects the remaining amount of toner for a certain color, if the controller 14 detects that the remaining amount of toner is lower than or equal to an alert threshold value, the display device 10 displays, on the currently-displayed operation screen, a display element, such as a banner, displaying a reminder message indicating that the remaining amount of toner is low.

Example of Hardware Configuration

The screen display manager 12 and the controller 14 in the apparatus are realized by causing a computer to execute a program expressing the functions of functional elements thereof.

Figure 2:
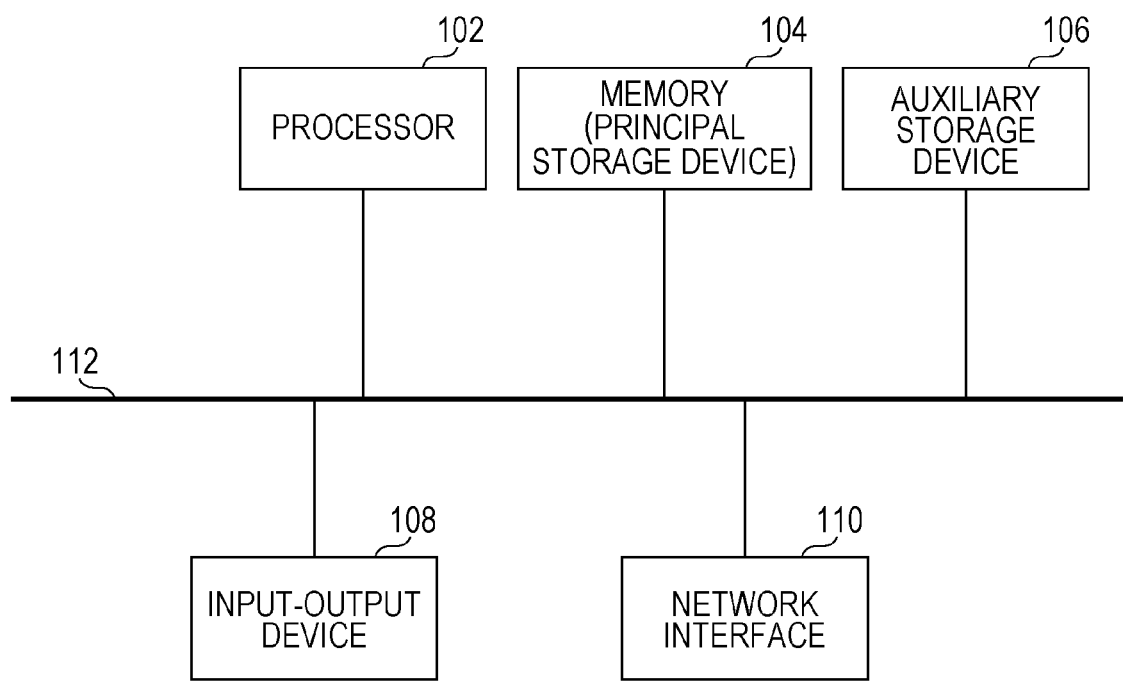
FIG. 2 illustrates a hardware configuration of a computer functioning as, for example, a controller and an image display manager of the apparatus.

For example, as shown in FIG. 2, the computer has a circuit configuration in which hardware components are connected by using a data transmission path, such as a bus 112. Examples of the hardware components include a processor 102, a memory (principal storage device) 104, such as a random access memory (RAM), an auxiliary storage device 106 serving as a non-transitory storage device, such as a flash memory, a solid state drive (SSD), or a hard disk drive (HDD), various types of input-output devices 108, and a network interface 110 that performs control for connecting with a network, such as a local area network. A program describing the processing contents of the screen display manager 12 and the controller 14 is installed in the computer via the network and is stored in the auxiliary storage device 106. The processor 102 executes the program stored in the auxiliary storage device 106 by using the memory 104, whereby the screen display manager 12 and the controller 14 are realized.

The processor 102 refers to hardware in a broad sense. Examples of the processor 102 include general processors (e.g., CPU: Central Processing Unit) and dedicated processors (e.g., GPU: Graphics Processing Unit, ASIC: Application Integrated Circuit, FPGA: Field Programmable Gate Array, and programmable logic device).

Furthermore, the processor 102 is broad enough to encompass one processor 102 or plural processors 102 in collaboration which are located physically apart from each other but may work cooperatively. The order of operations of the processor 102 is not limited to one described in the exemplary embodiment below, and may be changed.

Message Display Mode

There are multiple display modes for messages from the apparatus, such as a banner display mode, a full-screen display mode, and an icon display mode.

Figure 3A:
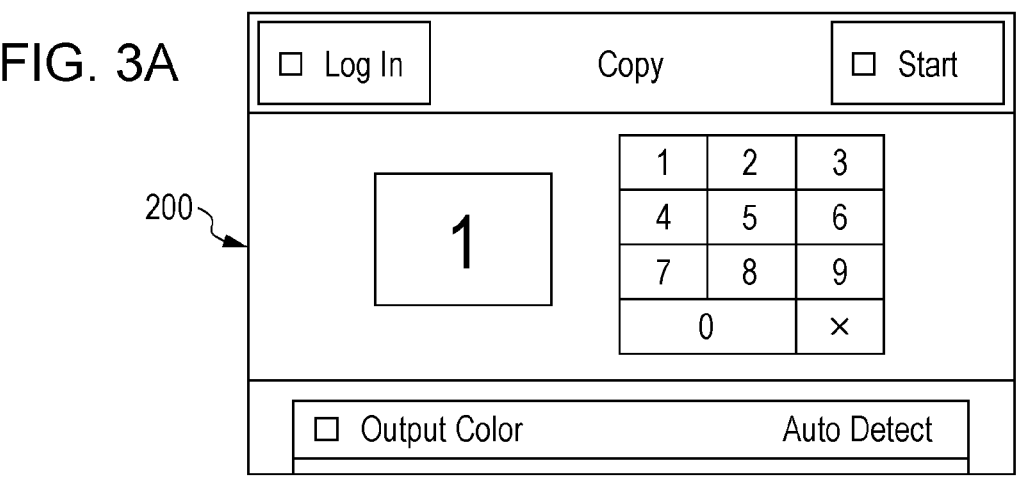
FIGS. 3A to 3C illustrate a banner display mode of a message.
Figure 3B:
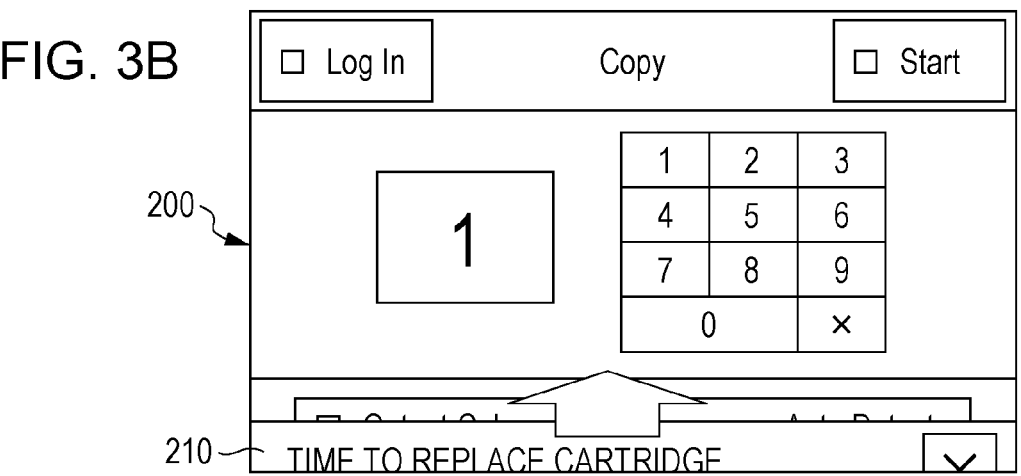
Figure 3C:
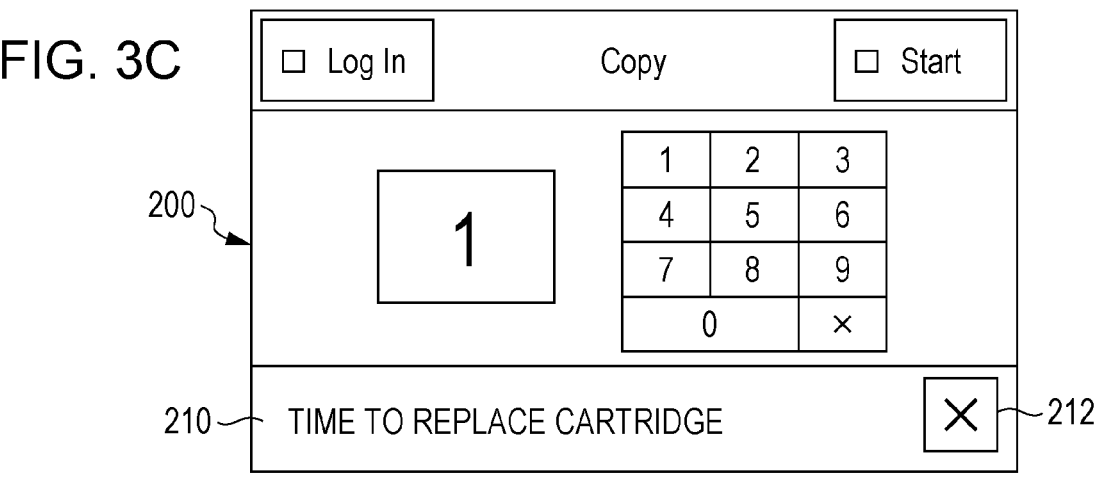

As shown in FIGS. 3A to 3C, the banner display mode involves displaying a banner 210 indicating a message at a lower end of the operation screen (i.e., a copy screen 200 shown as an example thereof in FIGS. 3A to 3C). The banner 210 covers only a portion of the lower end of the copy screen 200. FIGS. 3A, 3B, and 3C illustrate temporal transition of the display of the banner 210. As shown in FIGS. 3A to 3C, in this example, the banner 210 is displayed in the form of animation such that the banner 210 appears by being slid gradually from the lower end of the copy screen 200. FIG. 3C illustrates a state where the banner 210 is completely displayed. Subsequently, the banner 210 disappears when a predetermined time period elapses or when the user presses a cancel button 212. After the banner 210 is cancelled, the original copy screen 200 is displayed.

Figures 4, 5:
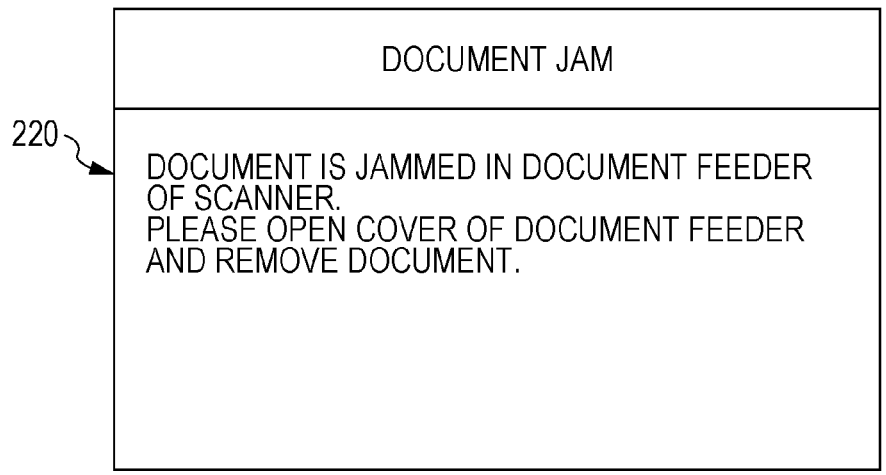
FIG. 4 illustrates a full-screen display mode of a message.
FIG. 5 illustrates job management data.

As shown in FIG. 4, in the full-screen display mode, a message screen 220 is displayed to cover the entire operation screen (e.g., the copy screen 200). The message screen 220 shown indicates that a document is jammed in the document feeder of the scanner and shows a header "DOCUMENT JAM" and a text message "DOCUMENT IS JAMMED IN DOCUMENT FEEDER OF SCANNER. PLEASE OPEN COVER OF DOCUMENT FEEDER AND REMOVE DOCUMENT.". The shown message screen 220 disappears when the jammed document is removed. In other words, once this message screen 220 is displayed, the message screen 220 does not disappear until the jammed document is removed. After the message screen 220 disappears, the original operation screen is displayed.

It should be noted that some message screens in the full-screen display mode have a button similar to the cancel button 212 in the example in FIGS. 3A to 3C and disappear when the operator presses that button. Accordingly, message screens in the full-screen display mode include a type that does not disappear until an error as a cause is resolved and a type that may disappear in response to a command from the operator. In this case, an error in a job refers to an abnormal state occurring in the apparatus and causing an interruption in the job.

Although not shown in the drawings, the icon display mode involves displaying a message in the form of an icon in the operation screen.

Example of Management Data

Next, an example of management data used by the screen display manager 12 for controlling the message display will be described. For example, the management data is stored in the auxiliary storage device 106 of the computer in which the controller 14 and the screen display manager 12 of the apparatus are implemented.

FIG. 5 illustrates job management data managed by the controller 14 for managing jobs. A job is a process executed by the controller 14 for controlling the one or more processing mechanisms 16 based on a command from the user. Examples of the jobs include a print job, a scan job, a copy job, a mail transmission job, and a file transfer job. Another example may be a combined job that causes multiple processing mechanisms 16 to cooperatively operate processes, as in a "scan and mail transmission" job involving scanning a document and transmitting the scanned data to a mail address designated by the user.

Each piece of job management data shown contains a job ID, a job type, a job owner, and a status. A job ID is unique identification information given to a job by the controller 14. Identification information will be abbreviated as "ID" hereinafter. A job type is the type of the job, and examples include a print job and a scan job. A job owner field has registered therein identification information of a user (i.e., commander) who has given a command for executing the job. A status indicates the current status of the job. Examples of the job status include a "standby" status, an "in progress" status, a "completed" status, and an "interrupted due to error" status. The apparatus shown in FIG. 1 has multiple processing mechanisms 16 and is capable of executing multiple jobs concurrently if the jobs do not involve the use of the same processing mechanism 16.

FIG. 6 illustrates management data indicating one or more resources used in a job for each job type. A representative example of one or more resources used in a job is the processing mechanism or mechanisms 16 operating when the job is executed. A software resource of the controller 14 used for executing a job is also an example of a resource used in the job. For example, if the number of connections for FTP communication from the apparatus to an external apparatus is limited to a predetermined number or smaller due to a certain reason, such as a security reason, the connection for the communication in the job involving the FTP communication is the resource used in the job. In the shown example, the job of each type indicated in the corresponding job type field involves the use of the one or more resources indicated in the "resource(s) used" field at the right side, but does not involve the use of other resources. For example, a print job involves the use of the printer as one of the processing mechanisms 16 included in the apparatus, but does not involve the use of other resources, such as the scanner and the facsimile apparatus.

FIG. 7 illustrates management data indicating one or more resources used in each job, corresponding to an execution command inputtable from an operation screen, for each operation screen displayed by the screen display manager 12. A group of operation screens of the apparatus is designed such that a displayed operation screen transitions to another operation screen in response to an operation performed on the displayed operation screen by the user.

Figure 8A:
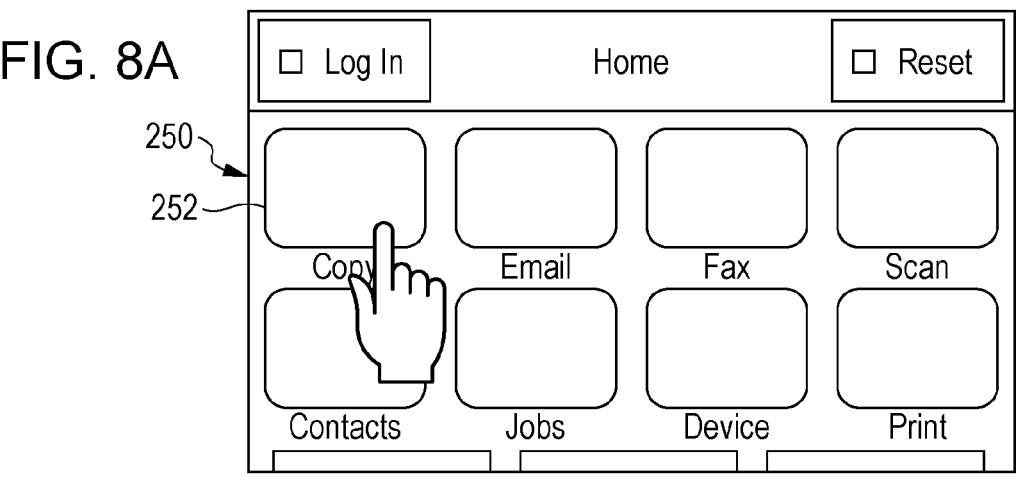
FIGS. 8A and 8B illustrate transition of display from one operation screen to another.
Figure 8B:
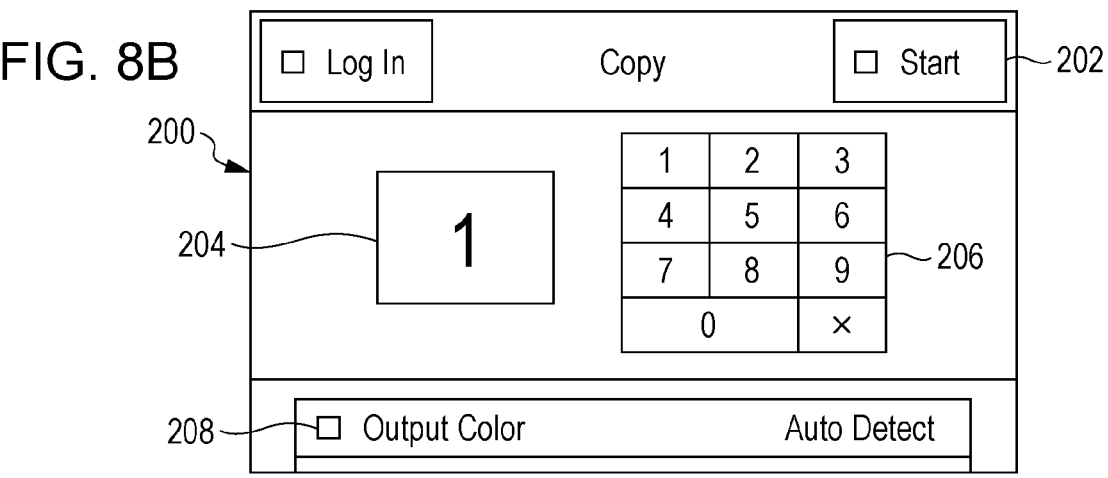

For example, as shown in FIGS. 8A and 8B, when the user performs a touching operation to select one of application buttons 252 displayed as a list on a main menu screen 250 of the apparatus, the operation screen displayed on the display device 10 transitions to an operation screen used for designating parameters for an application indicated by the application button 252. In the shown example, the user touches a copy button as one of the application buttons 252 on the main menu screen 250, thus causing the displayed screen to transition to the copy screen 200. The copy screen 200 displays a start button 202 for inputting a command for starting a copying process, a number-of-copies field 204 indicating the number of copies, a numerical keypad 206 for inputting the number of copies to be displayed in the number-of-copies field 204, and a group of setting items 208 displaying values of individual copy-related setting items and used for invoking an operation screen used for changing the values. Although only one of the setting items 208 is displayed in the shown display state, other setting items 208 arranged therebelow may be displayed by scrolling the copy screen 200. As in this example, the displayed operation screen generally transitions from an operation screen for general functions to an operation screen for detailed settings. The screen display manager 12 retains therein image-transition management data (not shown) expressing transition from which operation screen to which operation screen when a corresponding button is selected on the operation screen, and causes the operation screen to transition to another operation screen in response to a user operation in accordance with this management data.

The operation-screen transition includes transition in the forward direction and transition in the reverse direction. For example, the forward direction is the direction of transition from a screen used for general designations to a screen used for more detailed designations, as in a case of transition from, for example, a main screen for a hybrid function to a screen used for inputting with respect to basic functions constituting the hybrid function. The transition in the reverse direction involves transition in a direction opposite the forward direction. Examples of the transition in the reverse direction include transition to the operation screen displayed immediately before the currently-displayed operation screen in response to pressing of a "back" button and transition to the main menu screen in response to pressing of a "back to main menu" button.

Each piece of the management data in FIG. 7 contains a "resource(s) used" item and a "resource(s) used in screen of transition destination" item in association with a screen ID serving as the identification information of the corresponding operation screen.

Of the various types of operation screens, an operation screen to be opened in response to pressing of any of the application buttons 252 displayed on the main menu screen 250 is a screen that accepts an input of a command for an application to be provided by the apparatus, that is, an application function. Applications to be provided by the apparatus include a hybrid function having a combination of one or more basic functions, in addition to the basic functions, such as a scan function, a copy function, and a facsimile transmission function. For example, a scan-and-mail-transmission function is a hybrid function having a combination of a scan function and a mail transmission function. Furthermore, a box function is a hybrid function having a combination of, for example, a function for displaying a list of boxes, a function for displaying a list of documents saved in a box selected from the list of boxes, a function for printing a document selected from the list of documents, a function for transmitting the document selected from the list of documents to a mail address designated by the user, and a function for transferring the document selected from the list of documents to a storage location in a network designated by the user. A screen ID of an operation screen to be displayed when an application is invoked in this manner is also regarded as an ID of the application itself.

It is also common for an operation screen for an application to transition to an operation screen used for setting the parameters for a job to be executed in the application in response to a user operation. One example is transition from the copy screen 200 as an example of an application screen to a screen used for selecting a print-color mode (e.g., a monochrome mode or a full-color mode). There is also a case where transition is made from an application screen for a hybrid function to a screen for basic functions constituting the hybrid function. For example, when the user selects a document on a screen that displays a list of document groups in a box selected from a list of boxes and then selects printing as a job to be executed, the screen displayed on the display device 10 transitions to a print screen. A print screen is similar to the copy screen 200 mentioned above and includes a GUI component that accepts a designation of the number of prints, a GUI component used for invoking a screen for accepting the settings of various types of parameters, and a start button. After the user sets the number of copies and changes the parameters on this print screen or on the setting screen for the various types of parameters, the user presses the start button so that the controller 14 causes the printer as one of the processing mechanisms 16 to print the document selected by the user.

A box is a logical storage area that is provided within the apparatus (e.g., within the auxiliary storage device) and that stores document data. The apparatus may be provided with multiple boxes, and each box may have set therein a user who is allowed to use the box. For example, the user may save data of a document scanned by the scanner of the apparatus in the box that the user is allowed to use, or may perform a setting process such that facsimile data to be transmitted to oneself is saved in the box. A box may sometimes be called a confidential box or a security box.

In the management data in FIG. 7, the "resource(s) used" item indicates one or more resources to be used in a job corresponding to an execution start command input from the operation screen. For example, in the case of the copy screen 200 shown in FIGS. 8A and 8B, when the user presses the start button 202 in a state where the copy screen 200 is displayed, the scanner and the printer in the apparatus are activated to copy a document. Thus, the "resource(s) used" by the copy screen include the scanner and the printer. In contrast, a box screen simply displays a list of boxes provided in the apparatus and, when a box is selected from the list, the box simply transitions to the screen that displays the list of documents in the box. Specifically, when the box screen is displayed, an execution start command for a job that uses limited resources (e.g., the processing mechanisms 16 or a limited number of connected devices) is not given. Therefore, the box screen has no "resource(s) used".

The "resource(s) used in screen of transition destination" item indicates one or more resources to be used in a job corresponding to an execution start command input from a screen transitioned in the forward direction from the original screen. For example, after the box screen mentioned above undergoes several stages of screen transition, the print screen used for printing the document selected by the user from the box transitions to a mail transmission screen used for transmitting the selected document by electronic mail. Then, when the start button is pressed in the state where the print screen is displayed, the printer in the apparatus prints the selected document. Furthermore, when the start button is pressed in the state where the mail transmission screen is displayed, an electronic mail with the document attached thereto is transmitted by mail transmission software and the network interface in the apparatus. Thus, the box screen has no "resource(s) used" but has the printer and the network interface as "resource(s) used in screen of transition destination".

FIG. 9 illustrates message-display management data. Each piece of the management data contains an event ID item, an operator type item, a message item, and a display mode item.

An event ID is identification information for identifying the type of an event acting as a target of a message. In events detected by the controller 14, messages corresponding to some of the events should be provided as notifications to the user. The management data shown in FIG. 9 contains information for each event acting as a target of a message.

An operator type is the type of a user (i.e., an operator) operating the apparatus at the current time point, that is, when a message corresponding to the event is displayed on the display device 10. Examples of the operator type include a job owner (sometimes referred to as "owner" hereinafter) and a non-job-owner (sometimes referred to as "non-owner"

hereinafter). A job owner is an owner of a job in which an event acting as a target of a message has occurred, that is, a commander who has given a command for executing the job. A non-job-owner is a user other than the job owner of the job in which the event has occurred.

When a certain job is in progress, if an event, such as an error, occurs in the processing mechanism or mechanisms 16 related to the job or in information processing, the job is the "job in which an event has occurred" with respect to that event. A job in which an event has occurred is often a job interrupted by an error during the execution thereof or a job in progress. A job in which an event has occurred will be referred to as "target job", meaning that the job serves as a target of a message.

A message is a notification message to be provided to the user with regard to the event. In the example in FIG. 9, a message is prepared for each operator type.

A display mode is a display mode of a notification message to be provided to the user with regard to the event. Examples of the message display mode include the full-screen display mode and the banner display mode, both of which have been mentioned above. Furthermore, in this example, a mode in which a message is not displayed is also treated as one of the message display modes.

In the example in FIG. 9, a message display mode when the operator type is a non-owner is selected in accordance with whether or not there is competition in one or more resources to be used between a target job and an operation screen currently displayed on the display device 10 (referred to as "current screen" hereinafter). If resources used by the target job (see FIG. 6) include at least one of resources used by the current screen (i.e., one or more resources used in a job to be commenced from the current screen, see FIG. 7), there is competition in the one or more resources to be used between the target job and the current screen. If there is no overlapping between the one or more resources used in the target job and the one or more resources used in the current screen, there is no competition in the one or more resources to be used between the target job and the current screen. In the example in FIG. 9, the display mode used is more prominent when there is competition in the one or more resources than when there is no competition in the one or more resources.

Data with respect to an event with an event ID "0002" in the management data in FIG. 9 will be described in detail. This event corresponds to a case where a document jam has occurred in the document feeder of the scanner. Specifically, this event is an error event indicating that a job using the document feeder, such as a scan job or a copy job, has been interrupted.

In a message displaying process with respect to this event, if the operator of the apparatus at the time of the display is a job owner of the target job, a message "DOCUMENT JAM HAS OCCURRED IN DOCUMENT FEEDER OF SCANNER . . . " is displayed in the full-screen display mode (see FIG. 4). Specifically, the job owner who has given the command for executing the job acting as a cause of the error is responsible for removing and discarding the jammed document. Therefore, if the operator of the apparatus at the time when the message is displayed is the job owner, the message is displayed in the full-screen display mode as the most prominent display mode. This message in the full-screen display mode is continuously displayed until the document that has caused the error is removed from the document feeder. Once the document is removed, the full-screen display mode is canceled, and the operation screen displayed immediately before the full-screen display mode is displayed again.

In a case where the operator is a non-job-owner, the notification message to be provided to the operator is the same as that when the operator is a job owner in this example. In this case, if there is competition in one or more resources used between a job corresponding to an execution start command input from the current screen and the target job, that is, the job in which the document jam has occurred, the message is displayed in the full-screen display mode. Since the job corresponding to the execution start command input from the screen is not executable unless the document is removed, the full-screen display mode is used to prompt the operator to remove the document. Once the document is removed, the full-screen display mode is canceled, and the operation screen displayed immediately before the full-screen display mode (i.e., the "current screen" mentioned at the beginning of this paragraph) is displayed again. Accordingly, the operator may give a command for executing a job that uses the document feeder and the scanner from the operation screen.

If the operator is a non-job-owner and there is no competition in the one or more resources used between the job corresponding to the execution start command input from the current screen and the target job, a message is not displayed in the example in FIG. 9. In this case, since the job that the operator is trying to execute from the current screen does not use the document feeder, the job is executable even if an error has occurred in the document feeder. Alternatively, a message for prompting the operator to quickly remove the jammed document may be displayed in a display mode, such as the banner display mode or the icon display mode, less prominent than the full-screen display mode or less likely to interfere with an operation performed on the current screen.

Although not shown in FIG. 9, if the operator is a non-job-owner and there is no competition in the one or more resources used between the job corresponding to the execution start command input from the current screen and the target job, the message display mode may be changed based on whether or not there is competition in one or more resources used between another screen as a transition destination from the current screen and the target job. For example, if there is competition in one or more resources used between the screen as a transition destination from the current screen and the target job, the message may be displayed in a display mode, such as the banner display mode or the icon display mode, less likely to interfere with an operation performed on the current screen than the full-screen display mode. Moreover, if there is no competition in the one or more resources used between the screen as a transition destination from the current screen and the target job, the message does not have to be displayed or may be displayed in a display mode less prominent than when there is competition.

Next, data with respect to an event with an event ID "0055" in the management data in FIG. 9 will be described in detail. This event corresponds to a case where there is no response to a connection request transmitted to a transfer destination from the transfer destination when a job involving transferring of data via a network is to be executed. For example, if a connection with the transfer destination is not established due to no response from the transfer destination after a predetermined length of time elapsed from the start of the job, this event occurs. If the connection with the transfer destination is not established after the predetermined length of timeout period elapsed from the start of the job, the job results in a failure and thus undergoes termination. During the timeout period from the start of the job, the job itself continues without being interrupted, but a principal process of the job (i.e., a document transferring process) remains to be unexecuted. Until the timeout period elapses from the start of the job, the network connection from the apparatus to an external apparatus is occupied by the job, meaning that another job using the network connection is not executable until the job reaches a timeout point or is completed. Therefore, this event is not literally an error but may be regarded as being close to an error in that it occupies a resource, that is, the network connection.

Figure 10:
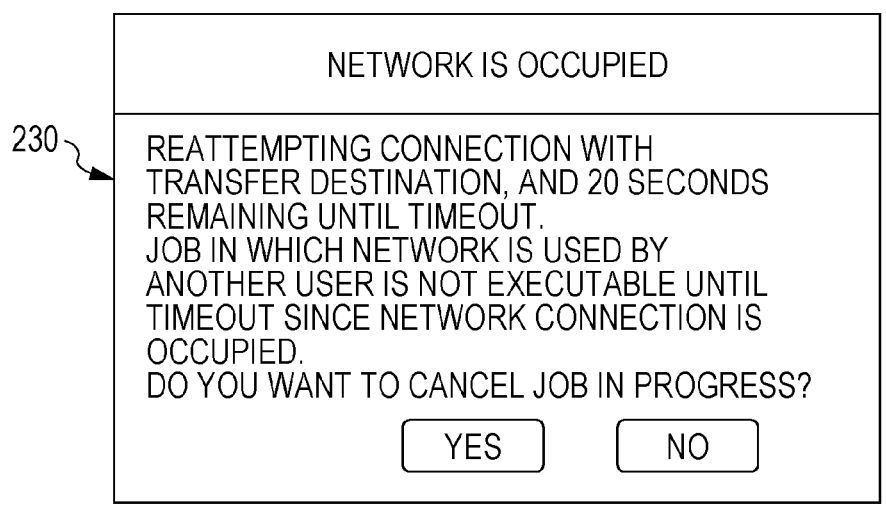
FIG. 10 illustrates an example of a message screen in a full-screen display mode, displayed when an event corresponding to "wait until timeout" is occurring.

In a message displaying process with respect to this event, if the operator of the apparatus at the time of the display is a job owner of the target job, the operator is informed of the content of the event and is asked to take a measure against the event. Specifically, in this case, the screen display manager 12 displays, in the full-screen display mode, a screen showing a message indicating that the job of the operator is occupying the network connection and is thus interfering with other users. FIG. 10 illustrates an example of a message screen 230 displayed in the full-screen display mode. In addition to the aforementioned message, the message screen 230 includes an inquiry about whether or not the job in progress (i.e., the job occupying the network connection and causing the event) is to be canceled, and GUI buttons for inputting commands for accepting ("YES") and refusing ("NO") the inquiry. If the operator selects "YES", the job currently in progress undergoes forced termination so that the network connection becomes available. Subsequently, for example, the apparatus becomes capable of accepting a job involving transferring of data via the network from a remote client apparatus and immediately executing the job. The full-screen display mode is canceled when the operator selects "YES" or "NO" in response to the inquiry or when the timeout period elapses.

If the operator is a non-job-owner, a notification message to be provided to the operator indicates that the network connection is being occupied by another job and also indicates the time remaining until the job reaches a timeout point. In this case, if there is competition in one or more resources used between a job corresponding to an execution start command input from the current screen and a target job, that is, a job in which a document jam has occurred, the message is displayed in a display mode, such as the banner display mode, less prominent than the full-screen display mode. In the case of the aforementioned document jam, a non-job-owner is capable of removing and discarding the jammed document, but is not capable of canceling the job in progress. Therefore, instead of asking the operator to take a measure by displaying the message in the full-screen display mode, information about the time remaining until the timeout point is simply provided to the operator. Since such information is simply provided to the operator, the banner display mode is used as the display mode in this example. Alternatively, the full-screen display mode including a cancel button may be employed. In that case, the operator may ascertain the situation in the full-screen display mode and subsequently cancel the display mode by pressing the cancel button.

If the operator is a non-job-owner and there is no competition in the one or more resources used between the job corresponding to the execution start command input from the current screen and the target job, the message is not displayed. In this case, since the job that the operator is trying to execute from the current screen does not use the network, the job is executable even if the network connection is occupied by another job.

Next, data with respect to an event with an event ID "0123" in the management data in FIG. 9 will be described in detail. This event corresponds to a case where a job in progress requires a long period of time for printing.

For example, the time period required for printing may be estimated from, for example, the number of pages in a target document and the number of prints. When printing is being executed, the time remaining until completion of the job may be estimated by subtracting a time period already elapsed from the start of the printing to the current time point from the required time period. Until completion of the job, the person who has given the command for executing the job and other users are not capable of starting the job that uses the printer in the apparatus. Specifically, in this case, since the job is being properly executed, there is a waiting period until another new job is to be commenced. This event occurs when the time remaining until completion of the job in progress that uses the printer is greater than or equal to a predetermined threshold value.

Even while this event is occurring, the job owner of the job that has caused this event, that is, the job in progress that involves printing, knows that the job owner has previously given a command for starting a job for performing a large volume of printing process. Therefore, when the job owner gives a command for executing a new job involving printing, the job owner naturally knows that the start of the new job may be delayed to some extent. Thus, in the management data in FIG. 9, if the current operator is the job owner of the job that has caused the event, message display is not performed.

Although not shown in FIG. 9, even when the operator is a non-job-owner and there is no competition in the one or more resources used between the job corresponding to the execution start command input from the current screen and the target job, if there is competition in one or more resources used between another screen as a transition destination from the current screen and the target job, a message oriented toward the non-job-owner may be displayed in a display mode, such as the banner display mode or the icon display mode, less likely to interfere with an operation performed on the current screen than the full-screen display mode.

If the operator is a non-job-owner, a notification message to be provided to the operator indicates that the printer is being occupied by another job and also indicates the time remaining until completion of the job. In the example in FIG. 9, if there is competition in one or more resources used between another job corresponding to an execution start command input from the current screen and the target job in this case, that is, the job occupying the printer, the message is displayed in a display mode, such as the banner display mode, less prominent than the full-screen display mode. In this case, the non-job-owner is not able to do anything but to wait for completion of the job in progress. Therefore, instead of asking the operator to take a measure by displaying the message in the full-screen display mode, information about the time remaining until the completion of the job is simply provided to the operator. Since such information is simply provided to the operator, the banner display mode, which is less likely to interfere with the display of the operation screen, is used as the display mode in this example.

If the operator is a non-job-owner and there is no competition in the one or more resources used between the job corresponding to the execution start command input from the current screen and the target job, the message is not displayed. In this case, since the job that the operator is trying to execute from the current screen does not use the printer, the job is executable even if the printer is occupied by another job.

Furthermore, although not shown in FIG. 9, even when the operator is a non-job-owner and there is no competition in the one or more resources used between the job corresponding to the execution start command input from the current screen and the target job, if there is competition in one or more resources used between another screen as a transition destination from the current screen and the target job, a message oriented toward the non-job-owner may be displayed in a display mode, such as the banner display mode or the icon display mode, less likely to interfere with an operation performed on the current screen than the full-screen display mode.

Example of Process

Figure 11:
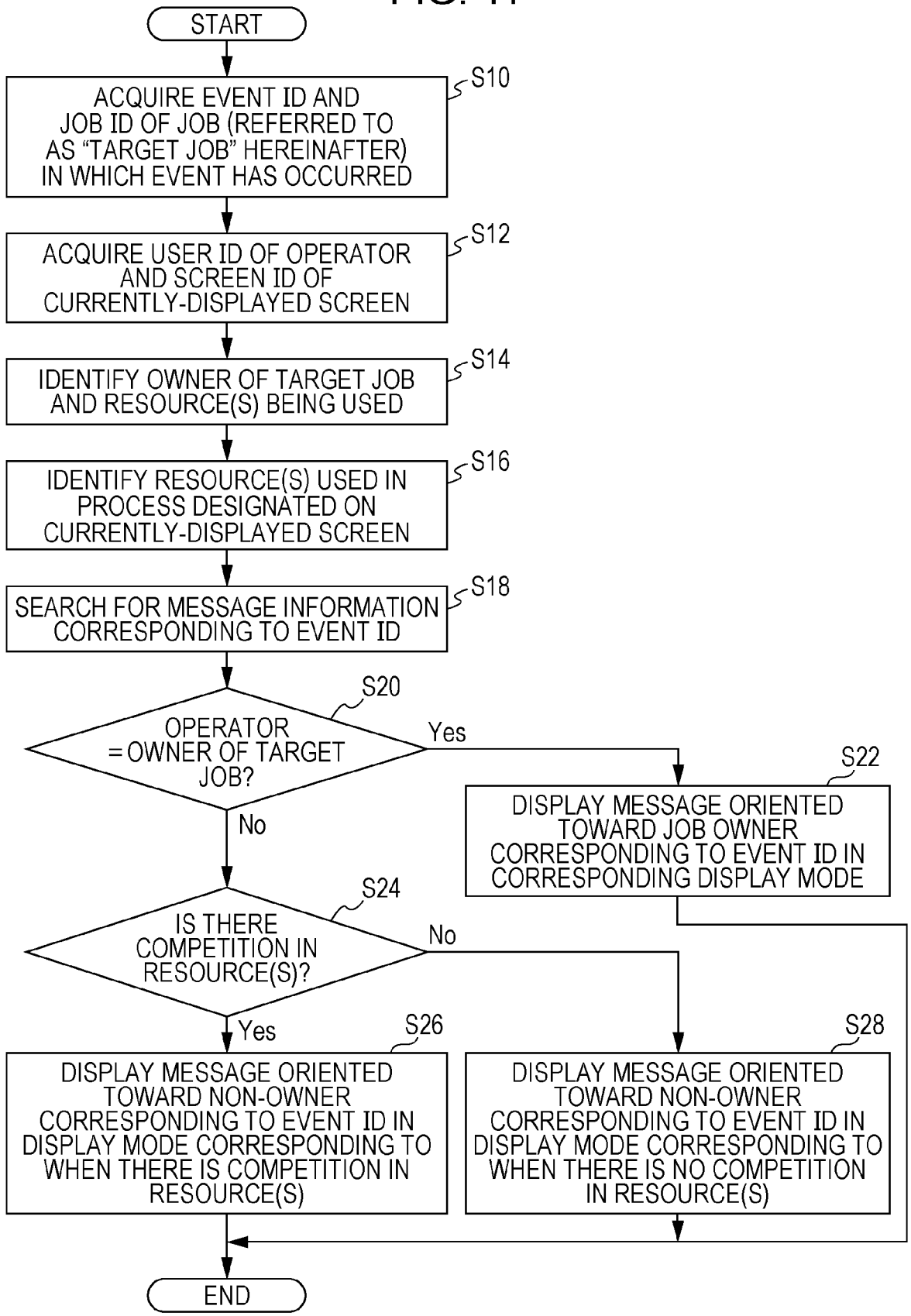
FIG. 11 illustrates an example of a message displaying process performed by the screen display manager.

Next, an example of the message displaying process executed by the screen display manager 12 will be described with reference to FIG. 11. The process in FIG. 11 is executed when an event acting as a message notification target (i.e., an event registered in the management data shown in FIG. 9) occurs in a state where an operation screen is displayed on the display device 10. Moreover, the process in FIG. 11 is also executed when the operator opens the operation screen during such an event (i.e., during a period in which the cause of the event is not resolved yet).

In the process in FIG. 11, the screen display manager 12 first acquires, from the controller 14 in step S10, an event ID of the event that has occurred or that is occurring, acting as a trigger for executing this process, and a job ID of a job in which the event has occurred (i.e., "target job"). The controller 14 ascertains the event ID and the job ID. In step S12, the screen display manager 12 acquires a user ID of a user (i.e., operator) currently operating the apparatus from the controller 14, and acquires a screen ID of an operation screen currently displayed on the display device 10. When using the apparatus, the user logs into the apparatus by inputting, for example, a user ID and a password into a log-in screen provided by the apparatus, or by causing an IC card reader provided in the apparatus to read an IC card retaining authentication information therein. The controller 14 manages the user ID recognized as a result of the log-in process as the user ID of the current operator. Step S10 and step S12 do not necessarily have to be executed in the order shown in FIG. 11.

In step S14, the screen display manager 12 searches for job management data (see FIG. 5) by using the job ID of the target job as a key, so as to identify the job owner and the job type of the target job. The screen display manager 12 searches for "resource(s) used" corresponding to the identified job type from the management data (see FIG. 6) of one or more resources used for each job type. Furthermore, in step S16, the screen display manager 12 searches for management data (see FIG. 7) of one or more resources used for each screen by using the screen ID acquired in step S12 as a key, so as to identify one or more resources used in the job corresponding to an execution start command that may be input from the currently-displayed operation screen. The order in which step S14 and step S16 are executed may be different from the order shown in FIG. 11.

In step S18, the screen display manager 12 acquires information corresponding to the event ID acquired in step S10 from the management data of messages for individual events shown in FIG. 9.

In step S20, the screen display manager 12 determines whether or not the current operator of the apparatus matches the job owner of the target job based on the information acquired in step S12 and step S14. If the determination result indicates "YES", the screen display manager 12 causes the display device 10 to display, in step S22, a message oriented toward the job owner corresponding to the event ID in the management data in FIG. 9 in a job-owner-oriented display mode. For example, if the event ID is "0002" or "0055", the message is displayed in the full-screen display mode. If the event ID is "0123", the message is not displayed.

If the determination result in step S20 indicates "NO", the screen display manager 12 determines in step S24 whether or not there is competition in one or more resources between the target job and the currently-displayed operation screen. If there are multiple resources used in the target job, it may be determined in step S24 whether or not there is competition between a resource that has caused the event acting as a trigger for this process and a resource used in a job corresponding to an execution command accepted from the current screen from among the multiple resources. If the determination result in step S24 indicates "YES", the screen display manager 12 causes the display device 10 to display, in step S26, a message oriented toward a non-job-owner corresponding to the event ID in the management data in FIG. 9 in a display mode corresponding to a case where there is competition in one or more resources. In step S26, for example, if the event ID is "0002", the message is displayed in the full-screen display mode, and if the event ID is "0055" or "0123", the message is displayed in the banner display mode.

If the determination result in step S24 indicates "NO", the screen display manager 12 causes the display device 10 to display, in step S28, the message oriented toward the non-job-owner corresponding to the event ID in the management data in FIG. 9 in a display mode corresponding to a case where there is no competition in one or more resources. In the example of the management data in FIG. 9, message display is not performed in step S28.

As described above, in this exemplary embodiment, it is determined whether or not the current operator matches the job owner of the target job, and the content of the message to be displayed and the display mode are controlled in accordance with the determination result. Therefore, a job-owner-oriented message is displayed to a job owner in a job-owner-oriented display mode, whereas a non-job-owner-oriented message is displayed to a non-job-owner in a non-job-owner-oriented display mode.

The control of the display mode of a message in accordance with whether or not there is competition in one or more resources in a case where the operator is a non-job-owner in the example described with reference to FIGS. 9 and 11 may be regarded as the following control. Specifically, this control may be regarded as control that involves displaying a message in a case where the currently-displayed operation screen is capable of accepting a command for executing a job that uses one or more resources occupied by the target job. This implies that a message is displayed on a screen when there is competition in one or more resources between the currently-displayed operation screen and the target job.

In the example shown in FIGS. 9 and 11, the management data of messages for individual events contains information that defines a display mode when each message is to be displayed. However, such a method is merely an example.

As another example, the message display mode may be set based on the type of an event. FIG. 12 illustrates an example of management data of messages for individual events. This management data contains, for each event ID, information about the type of the event and information about a message corresponding to the event. Examples of the event type include "error", "wait until timeout", and "wait for completion of process". The event type "error" corresponds to a type of an event that causes an interruption in the job in progress, as in the aforementioned event with the event ID "0002". The event type "wait until timeout" indicates that the job in progress is on standby until a timeout point is reached, as in the aforementioned event with the event ID "0055". The event type "wait for completion of process" indicates that the remaining time in which the job in progress occupies one or more resources is greater than or equal to a threshold value, as in the aforementioned event with the event ID "0123".

Figure 13:
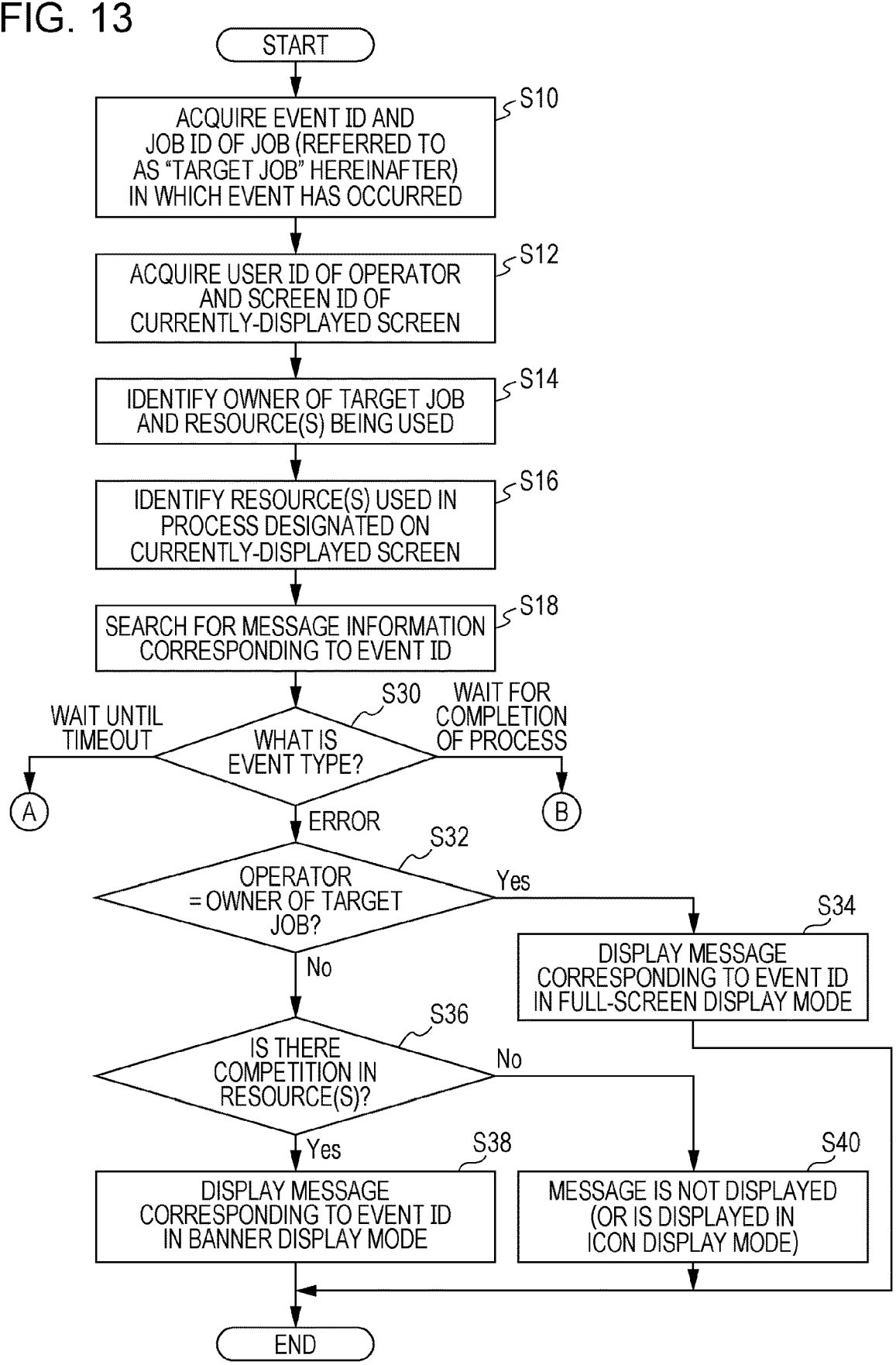
FIG. 13 illustrates a part of the message displaying process performed by the screen display manager in a different example.

A message display control process performed by the screen display manager 12 in this example will now be described with reference to FIGS. 13 to 15. Step S10 to step S18 are identical to the steps with the same reference signs in the process in FIG. 11.

After step S18, the screen display manager 12 acquires the event type corresponding to the event ID acquired in step S10 from the management data in FIG. 12, so as to determine in step S30 whether the event type is any of the event types "error", "wait until timeout", and "wait for completion of process". If the event type is the event type "error", the screen display manager 12 determines in step S32 whether or not the current operator matches the job owner of the target job. If the determination result indicates "YES", the screen display manager 12 causes the display device 10 to display a message corresponding to the event ID in the management data in FIG. 12 in the predetermined full-screen display mode as a job-owner-oriented display mode in step S34, and ends the process.

If the determination result in step S32 indicates "NO", the screen display manager 12 determines in step S36 whether or not there is competition in one or more resources between the target job and the currently-displayed operation screen. If the determination result indicates "YES", the screen display manager 12 causes the display device 10 to display, in step S38, the message corresponding to the event ID in the predetermined banner display mode as a display mode corresponding to a case where there is competition in one or more resources. If the determination result in step S36 indicates "NO", the screen display manager 12 does not cause the display device 10 to display the message corresponding to the event ID in step S40. Instead of displaying the message, a display mode (e.g., icon display mode) less prominent than the banner display mode may be used in step S40.

Figure 14:
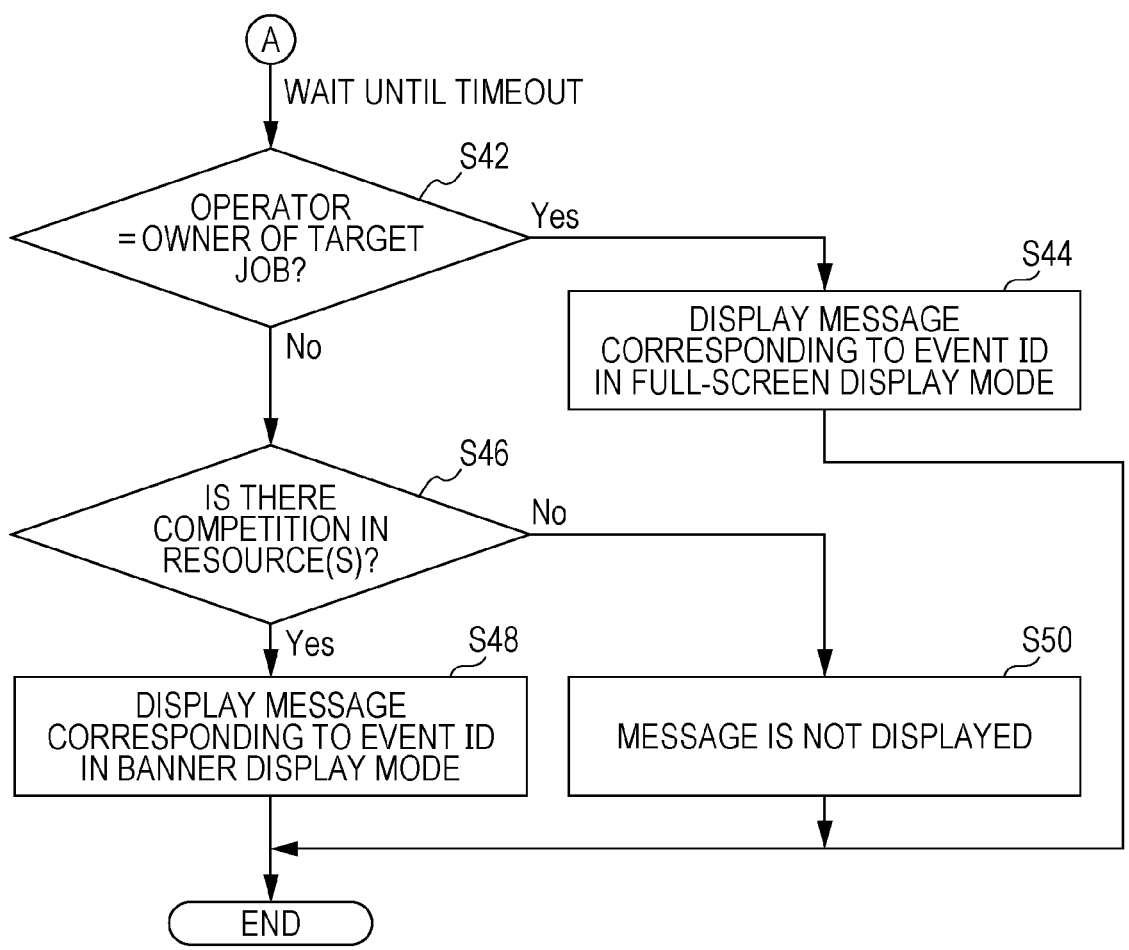
FIG. 14 illustrates another part of the message displaying process performed by the screen display manager in the different example.

If it is determined in step S30 that the event type is the event type "wait until timeout", the screen display manager 12 determines in step S42 whether or not the current operator matches the job owner of the target job, as shown in FIG. 14. If the determination result indicates "YES", the screen display manager 12 causes the display device 10 to display, in step S44, the message corresponding to the event ID in the management data in FIG. 12 in the predetermined full-screen display mode as a job-owner-oriented display mode, and ends the process. If the determination result in step S42 indicates "NO", the screen display manager 12 determines in step S46 whether or not there is competition in one or more resources between the target job and the currently-displayed operation screen. If the determination result indicates "YES", the screen display manager 12 causes the display device 10 to display, in step S48, the message corresponding to the event ID in the predetermined banner display mode as a display mode corresponding to a case where there is competition in one or more resources. If the determination result in step S46 indicates "NO", the screen display manager 12 does not cause the display device 10 to display the message corresponding to the event ID in step S50.

Figure 15:
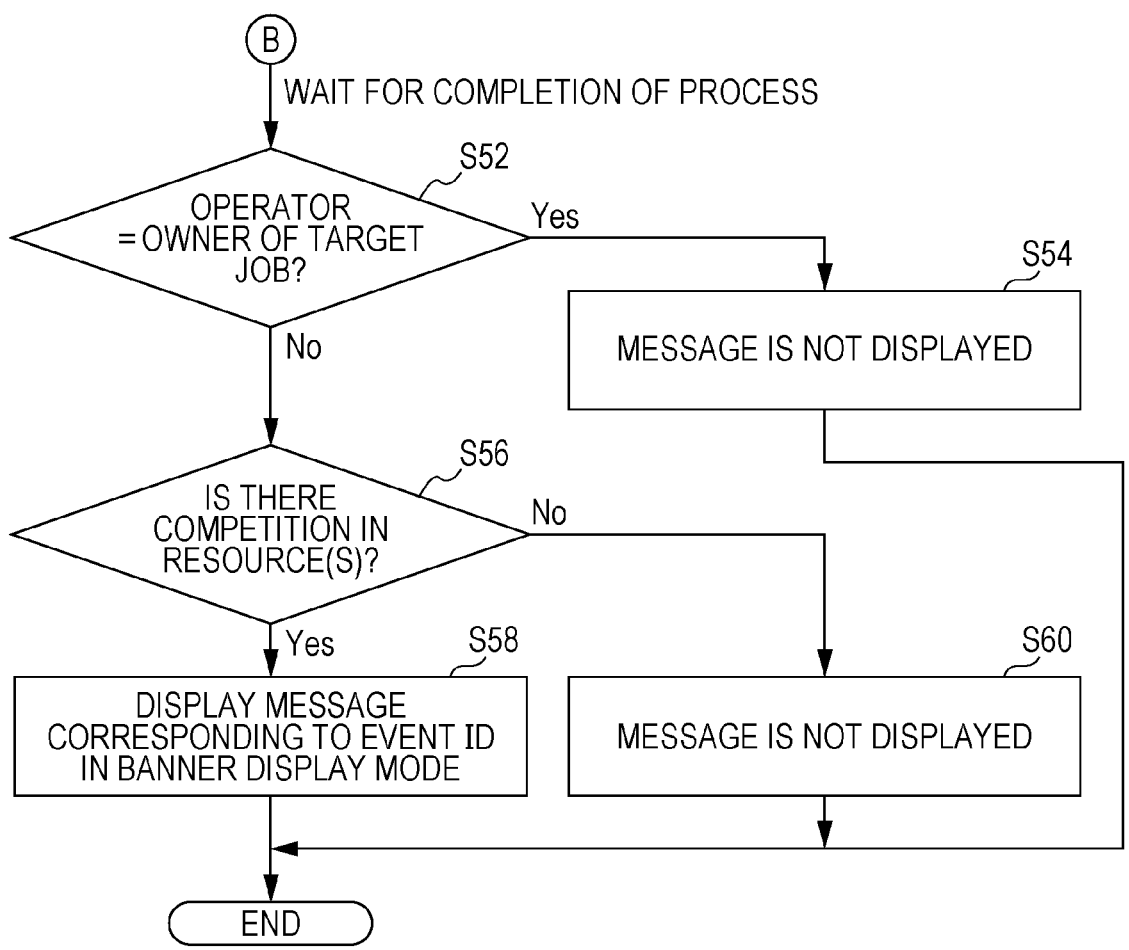
FIG. 15 illustrates yet another part of the message displaying process performed by the screen display manager in the different example.

If it is determined in step S30 that the event type is the event type "wait for completion of process", the screen display manager 12 determines in step S52 whether or not the current operator matches the job owner of the target job, as shown in FIG. 15. If the determination result indicates "YES", the screen display manager 12 does not perform message display in step S54. If the determination result in step S52 indicates "NO", the screen display manager 12 determines in step S56 whether or not there is competition in one or more resources between the target job and the currently-displayed operation screen. If the determination result indicates "YES", the screen display manager 12 causes the display device 10 to display, in step S58, the message corresponding to the event ID in the predetermined banner display mode as a display mode corresponding to a case where there is competition in one or more resources. If the determination result in step S56 indicates "NO", the screen display manager 12 does not perform message display in step S60.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The exemplary embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An apparatus comprising:
   a processor configured to
     identify a user who is operating the apparatus provided with the processor, and
     execute display control involving controlling display of a notification related to a process executed by the apparatus on a display device provided in the apparatus in accordance with whether or not the identified user is a commander who has given a command for executing the process,
   wherein, in a case where the notification is related to an abnormality occurring during execution of the process and the identified user is the commander, the display control involves performing control for displaying the notification in a display mode in which the notification does not disappear from the display device until the abnormality is resolved.

2. The apparatus according to claim 1,
   wherein the display control involves controlling a display mode of the notification on the display device.

3. The apparatus according to claim 2,
   wherein, in a case where the notification is related to an abnormality occurring during execution of the process and the identified user is the commander, the display control involves performing control for displaying the notification in a display mode more prominent than a display mode for the notification in a case where the user is not the commander.

4. The apparatus according to claim 3, wherein, in a case where the notification is related to an abnormality occurring during execution of the process and the identified user is the commander, the display control involves performing control for displaying the notification in a display mode in which the notification does not disappear from the display device until the abnormality is resolved.

5. The apparatus according to claim 1, wherein, in a case where the identified user is not the commander, if an operation screen capable of accepting a command for executing a function using a resource occupied by the process in one or more resources included in the apparatus is displayed or is being displayed on the display device, the display control involves performing control for displaying the notification, the operation screen being included in one or more operation screens of the apparatus.

6. The apparatus according to claim 2, wherein, in a case where the identified user is not the commander, if an operation screen capable of accepting a command for executing a function using a resource occupied by the process in one or more resources included in the apparatus is displayed or is being displayed on the display device, the display control involves performing control for displaying the notification, the operation screen being included in one or more operation screens of the apparatus.

7. The apparatus according to claim 3, wherein, in a case where the identified user is not the commander, if an operation screen capable of accepting a command for executing a function using a resource occupied by the process in one or more resources included in the apparatus is displayed or is being displayed on the display device, the display control involves performing control for displaying the notification, the operation screen being included in one or more operation screens of the apparatus.

8. The apparatus according to claim 1, wherein, in a case where the identified user is not the commander, if an operation screen capable of accepting a command for executing a function using a resource occupied by the process in one or more resources included in the apparatus is displayed or is being displayed on the display device, the display control involves performing control for displaying the notification, the operation screen being included in one or more operation screens of the apparatus.

9. The apparatus according to claim 4, wherein, in a case where the identified user is not the commander, if an operation screen capable of accepting a command for executing a function using a resource occupied by the process in one or more resources included in the apparatus is displayed or is being displayed on the display device, the display control involves performing control for displaying the notification, the operation screen being included in one or more operation screens of the apparatus.

10. The apparatus according to claim 1, wherein, in a case where the identified user is not the commander, if a resource used in the process executed by the apparatus and the resource used in a process corresponding to an execution command inputtable from an operation screen being displayed compete against each other, the display control involves displaying the notification in a display mode more prominent than in a case where the resources do not compete against each other.

11. The apparatus according to claim 2, wherein, in a case where the identified user is not the commander, if a resource used in the process executed by the apparatus and the resource used in a process corresponding to an execution command inputtable from an operation screen being displayed compete against each other, the display control involves displaying the notification in a display mode more prominent than in a case where the resources do not compete against each other.

12. The apparatus according to claim 3, wherein, in a case where the identified user is not the commander, if a resource used in the process executed by the apparatus and the resource used in a process corresponding to an execution command inputtable from an operation screen being displayed compete against each other, the display control involves displaying the notification in a display mode more prominent than in a case where the resources do not compete against each other.

13. The apparatus according to claim 1, wherein, in a case where the identified user is not the commander, if a resource used in the process executed by the apparatus and the resource used in a process corresponding to an execution command inputtable from an operation screen being displayed compete against each other, the display control involves displaying the notification in a display mode more prominent than in a case where the resources do not compete against each other.

14. The apparatus according to claim 4, wherein, in a case where the identified user is not the commander, if a resource used in the process executed by the apparatus and the resource used in a process corresponding to an execution command inputtable from an operation screen being displayed compete against each other, the display control involves displaying the notification in a display mode more prominent than in a case where the resources do not compete against each other.

15. The apparatus according to claim 5, wherein, in a case where the identified user is not the commander, if a resource used in the process executed by the apparatus and the resource used in a process corresponding to an execution command inputtable from an operation screen being displayed compete against each other, the display control involves displaying the notification in a display mode more prominent than in a case where the resources do not compete against each other.

16. The apparatus according to claim 1, wherein, in a case where the identified user is not the commander, if a resource used in the process executed by the apparatus and the resource used in a process corresponding to an execution command inputtable from an operation screen being displayed compete against each other, the display control involves displaying the notification in a display mode more prominent than in a case where the resource used in the process executed by the apparatus and the resource used in a process corresponding to an execution command inputtable from an operation screen as a transition destination from the operation screen compete against each other.

17. The apparatus according to claim 5,
wherein the notification is a first notification indicating that another process using the resource is not executable until completion of the process since the resource of the one or more resources included in the apparatus is being occupied by the process, and
wherein the display control involves control for not displaying the first notification if the identified user is the commander.

18. The apparatus according to claim 5,
wherein the notification is a second notification that encourages a measure to be taken against a state where any of the one or more resources included in the apparatus is occupied by the process, and
wherein the display control involves performing control for displaying the second notification if the identified user is the commander.

19. A non-transitory computer readable medium storing a program causing a computer included in an apparatus to execute a process, the process comprising:
identifying a user who is operating the apparatus; and
executing display control involving controlling display of a notification related to a process executed by the apparatus on a display device provided in the apparatus in accordance with whether or not the identified user is a commander who has given a command for executing the process,
wherein, in a case where the notification is related to an abnormality occurring during execution of the process and the identified user is the commander, the display control involves performing control for displaying the notification in a display mode in which the notification does not disappear from the display device until the abnormality is resolved.

* * * * *